United States Patent [19]
Schmid et al.

[11] Patent Number: 5,895,808
[45] Date of Patent: Apr. 20, 1999

[54] PROCESS FOR PRODUCING COMPOUND MATERIALS WITH A POLYLACTAM MATRIX WHICH CAN BE THERMALLY POSTFORMED

[75] Inventors: Eduard Schmid, Valbeuna, Switzerland; Roman Eder, Barbaraweg, Germany; Urs Wild, Via Coller, Switzerland

[73] Assignee: EMS-Inventa AG, Zürich, Switzerland

[21] Appl. No.: 08/784,905

[22] Filed: Jan. 16, 1997

[30] Foreign Application Priority Data

Jan. 25, 1996 [DE] Germany .......................... 196 02 638

[51] Int. Cl.⁶ .......................... C08G 69/08; C08G 69/18
[52] U.S. Cl. .......................... 528/310; 528/323; 528/312; 528/335; 528/338; 528/349; 428/411.1; 264/240
[58] Field of Search .......................... 528/310, 323, 528/312, 335, 338, 349; 525/424, 454, 903; 428/411.1; 264/240, 331.19

[56] References Cited

U.S. PATENT DOCUMENTS 3,575,938  4/1971  Tierney .
4,582,879  4/1986  Frisch et al. .......................... 525/424

FOREIGN PATENT DOCUMENTS 2801990  1/1978  Germany .

OTHER PUBLICATIONS

"BASF Intermediate Products 1993".

*Primary Examiner*—Ponnathapura Achutamurthy
*Assistant Examiner*—P. Ponnaluri
*Attorney, Agent, or Firm*—Browdy Andneimark

[57] ABSTRACT

A process for producing composite materials which can be thermally postformed, with a matrix of polylactam produced by means of activated anionic polymerization is offered.

23 Claims, No Drawings

PROCESS FOR PRODUCING COMPOUND MATERIALS WITH A POLYLACTAM MATRIX WHICH CAN BE THERMALLY POSTFORMED

FIELD OF THE INVENTION

The invention relates to a process for producing by means of activated anionic polymerization composite materials which can be thermally postformed, consisting of a matrix of polylactam which encloses a reinforcing fiber structure.

BACKGROUND OF THE INVENTION

Pultruded profiles, organic sheets, hollow bodies and containers, as well as semi-finished materials with reinforcing fiber fabrics, braids, weaves, knits, embroideries, non wovens, fiber bundles and rovings, etc. embedded in a thermoset matrix, for example of polyester or epoxy resin, have found various uses in a growing market.

Such composite parts with a matrix which completely encloses the textile reinforcement, show good dimensional stability and their properties are to a large degree unsensitive to moisture; they show a high resistance against aqueous systems, greases, oils, motor fuels and alcohols, and resist environmental effects with a sufficiently good thermal resistance.

A basic principle for their production therefore is as perfect as possible an impregnation of the textile reinforcement structures by the resin in the liquid state with subsequent shaping and curing, preferably by the effects of heat and pressure.

However, postforming, which is often necessary, is not possible for the thermoset matrices.

In producing composite materials with a thermoplastic matrix, the high matrix viscosity makes difficult the complete wetting and impregnation of the reinforcement structure.

In spite of the application of heat and pressure, the reinforcement fibers are often insufficiently embedded and gas inclusions might not be completely eliminated.

A method for producing cast molded bodies from anionic polymerized lactam, particularly lactam-6, containing a filler material, is described in German Patent Publication DE-A-28 01 990. The filler materials admixed with the lactam melt are intended to reduce the interfering large shrinkage of the formed bodies, known in connection with cast polyamides. It should be noted that, in accordance with the well-known prior art, the activated, anionically catalyzed lactam polymerization is here performed by using two separate lactam melts, one of which contains the catalyst and the other the activator.

OBJECT AND SUMMARY OF THE INVENTION

It was therefore the object of the invention to make available a simple and reliable method for producing reinforced composite materials, which can be postformed, containing a polylactam matrix with constant properties.

This object is attained by the process for the production of composite materials which fully can be thermally postformed and which have a matrix which encloses the reinforcement-fiber structure and consists of polylactam and has the characterizing features in that, for initiating the anionic polymerization, a liquid system, which is stable when stored and simultaneously contains an activator and a catalyst as well as selectively additives, is dosed into an anhydrous lactam melt and is homogeneously admixed with it; subsequently, by controlling the temperature, the polymerizing lactam melt impregnates and encloses the reinforcement fiber structure, after which further polymerization and shaping take place, which can be followed by postforming and/or subsequent thermal treatment; such object is moreover attained by the composite materials, which can be produced in this manner.

It is attained in particular by means of a process wherein an activator- and catalyst-containing lactam melt, which is still in the low-viscosity state, penetrates the reinforcement-fiber structures at the start of the activated anionic lactam polymerization and completely encloses them to form the thermoplastic matrix of the composite materials in the polymerized and firm state and in this way makes its postforming possible.

DETAILED DESCRIPTION

In this case the catalytically activated lactam melt is produced from lactam and 0.5 to 15 parts by weight of a liquid system, which simultaneously contains the activator and catalyst in solution.

The liquid system essentially consists of a) 30 to 80 parts by weight of
 a1) at least one N-substituted carboxylic acid amide composite, and/or
 a2) at least one N,N'-disubstituted urea composite, both of which selectively contain a heterocyclic ring formed by their substituents, as the solvent,
b) 5 to 40 parts by weight of at least one alkali or alkali earth lactamate as the catalyst,
c) 5 to 40 parts by weight of at least one composite activating the anionic lactam polymerization, wherein a), b) and c) add up to 100 parts by weight, and additionally selectively of d) process- and/or property-dependent additives, which do not or directedly affect the polymerization and are compatible with the components a), b) and c).

The N,N'-disubstituted urea composites a2) are known composites and described, for example, in the BASF company publication "BASF-Zwischenprodukte 1993" |BASF Intermediate Products|.

Also suitable N-substituted carboxylic acid amide composites a1) and lactamates b) are described in U.S. Pat. No. 3,575,938.

Preferred activating composites c) are blocked isocyanates and polyisocyanates, carbodiimides and polycarbodiimides, particularly those blocked with lactam, or hydroxy-fatty alkyl oxazolines.

Preferably used lactams are caprolactam, enantholactam, laurinlactam and their mixtures, reinforcing fiber fabrics, braids, weaves, knits, embroideries, non wovens, fiber bundles and rovings, etc. of glass-, mineral-, aramide- and carbon fibers, which must be free of moisture to the greatest degree, are used as reinforcement structures.

The process in accordance with the invention is distinguished by the following essential advantages:

It is possible to start with a pure, dry lactam melt, which is not subject to any aging problems.

The liquid system used, which contains both an activator and a catalyst, is very stable when stored and can be easily dosed up at increased temperatures and even at room temperature, and is added to the lactam only immediately prior to the start of the polymerization.

The rapidly initiated activated anionic lactam polymerization is reproducible and its speed can be controlled by means of the temperature and the activator/catalyst concentration in the liquid system.

The lactam melt, which has a low viscosity at the start of polymerization, wets and impregnates the reinforcement-fiber structure well, so that defects caused by gas inclusions or damaged reinforcement fibers are prevented to a great extent.

This is very advantageous, particularly for structures with a high volume proportion of tightly packed reinforcement fibers, such as the claimed reinforcing fiber fabrics, braids, weaves, knits, embroideries, non wovens, fiber bundles and rovings, etc.

In this way it is possible to produce composite materials with a high volume fraction of reinforcement fibers with good fiber-matrix adhesion.

The process in accordance with the invention can be employed particularly advantageously for the continuous production of composite materials.

In contrast to this, composite materials in accordance with the prior art, which are produced from a polymeric, highly-viscous polyamide melt, as a rule require high pressures, high temperatures and clearly longer processing times, all of which increase the danger of damage to the composite material.

Dosing of a constant volume and homogeneous mixing of the liquid system with the low-viscosity lactam melt can be easily performed by means of the process of the invention.

The introduction of the additives can selectively take place directly into the lactam melt together with the liquid system and/or directly into the activated, but preferably still low-viscous melt.

So-called static mixers for example those of the Sulzer company at Winterthur (CH), or rotating mixing heads, for example those of the Dosiplast company, Balzers (FL), are suitable for continuous process variants.

In a preferred way the polymerization is controlled through the concentration of the activator and catalyst in the liquid system, the type of the activator and the reaction temperature.

In the process the reaction temperature is increased to a maximum of 300° C. in order to accelerate the reaction speed.

In preferred process variants shaping is performed continuously. Here, the pultrusion method is particularly preferred for profiles, plates and tubes.

In special process variants polymerization takes place at least partly during shaping.

The composite materials can be thermally postformed, connected with each other or other elements made of the same or a similar compatible matrix, for example by welding, and in this way can be the subject of many shaping operations by increasing the temperature above the melting point of the matrix.

The composite materials in accordance with the invention are advantageously employed as formed bodies. In this respect, profiled elements for cable and line covers, structural profiles for lightweight material structures, frame elements of control boxes, apparatus and machinery, are preferred. Plate-shaped elements can be advantageously produced by additionally using heated pressure rollers.

A preferred variant of the process in accordance with the invention is the production of long-fiber filled granules which can be further processed by means of injection molding or extrusion methods. If care is taken not to damage the fibers during this process, formed bodies with excellent mechanical properties result.

The process in accordance with the invention is also excellently suited for the so-called resin transfer molding method and the rotomolding method, preferably where a reinforcing fiber structure is used.

Preferred postforming operations by means of at least partial or sectional pressure, vacuum and heat acting on the formed bodies, selectively up to or beyond the melting point of the matrix are, for example, folding or three-dimensional shaping by pressing or welding.

The invention also includes the composite materials which can be manufactured in accordance with the process of the invention.

What is claimed is:

1. A process for producing a postformable composite matrix of polylactam and a reinforcing fiber structure, said process comprising:

providing a liquid system for anionic polymerization of a lactam, said liquid system comprising an activator, a catalyst and optional additives, providing an anhydrous lactam melt separate from said liquid system, homogeneously admixing said liquid system and said anhydrous lactam melt to provide a low-viscosity mixture, impregnating and embedding a reinforcement fiber structure with said low-viscosity mixture during initial polymerization of said lactam melt to provide an impregnated fiber structure, and further polymerizing said lactam melt by anionic polymerization and shaping said impregnated fiber structure.

2. The process in accordance with claim 1, wherein the polylactam is polycaprolactam, polyenatholactam, polylaurinlactam or their mixture.

3. The process in accordance with claim 1, wherein the reinforcing fiber structure is selected from the group consisting of braids, weaves, knits, embroideries, non-wovens, fiber bundles, rovings and combinations thereof.

4. The process in accordance with claim 1, wherein the reinforcement fibers are selected from the group consisting of glass-, mineral-, aramide- and carbon fibers.

5. The process in accordance with claim 1, wherein the liquid system consists of a) 30 to 80 parts by weight as solvent of a1) at least one N-substituted carboxylic acid amide which optionally contains a heterocyclic ring, and/or a2) at least one N,N'-disubstituted urea, which optionally contains a heterocyclic ring, b) 5 to 40 parts by weight of at least one alkali or alkaline earth lactamate as the catalyst, and c) 5 to 40 parts by weight of said activator, wherein a), b) and c) are present in a total amount of 100 parts by weight, and additionally adding said optional additives, which are process- and/or property-dependent additives, and said additives do not adversely affect the polymerization and are compatible with the solvent, the catalyst and the activator.

6. The process in accordance with claim 1, wherein the polymerization is controlled by controlling the activator/catalyst concentration in the liquid system, the type of activator and the temperature to ensure a low viscosity of the polymerizing lactam melt until full impregnation of the reinforcement fiber structure has occurred.

7. The process in accordance with claim 1, wherein following the penetration of the fiber structure, the polymerization temperature is increased to not more than 300° C.

8. The process in accordance with claim 1, wherein shaping takes place continuously in a tool for the formation of profiled pelletizable elements, plates, tubes, or the formation of compacted profiled strands.

9. The process in accordance with claim 1, wherein shaping takes place in accordance with a resin transfer molding method or by the rotomolding method.

10. The process in accordance with claim 1, further comprising subsequently postforming under pressure, vacuum, heat or a combination thereof.

11. Composite materials produced in accordance with the process of claim 1.

12. The process in accordance with claim 2, wherein the reinforcing fiber structure is selected from the group consisting of braids, weaves, knits, embroideries, non-wovens, fiber bundles, rovings and combinations thereof.

13. The process in accordance with claim 2, wherein the reinforcement fibers are selected from the group consisting of glass-, mineral-, aramide- and carbon fibers.

14. The process in accordance with claim 13, wherein the liquid system consists of a) 30 to 80 parts by weight as solvent of a1) at least one N-substituted carboxylic acid amide which optionally contains a heterocyclic ring, and/or a2) at least one N,N'-disubstituted urea, which optionally contains a heterocyclic ring, b) 5 to 40 parts by weight of at least one alkali or alkaline earth lactamate as the catalyst, and c) 5 to 40 parts by weight of said activator, wherein a), b) and c) are present in a total amount of 100 parts by weight, and additionally adding said optional additives, which are process- and/or property-dependent additives, and said additives do not adversely affect the polymerization and are compatible with the solvent, the catalyst and the activator.

15. The process in accordance with claim 14, wherein the polymerization is controlled by controlling the activator/catalyst concentration in the liquid system, the type of activator and the temperature to ensure a low viscosity of the polymerizing lactam melt until full impregnation of the reinforcement fiber structure has occurred.

16. The process in accordance with claim 15, wherein following the penetration of the fiber structure, the polymerization temperature is increased to not more than 300° C.

17. The process in accordance with claim 16, wherein shaping takes place continuously in a tool for the formation of profiled pelletizable elements, plates, tubes, or the formation of compacted profiled strands.

18. The process in accordance with claim 16, wherein shaping takes place in accordance with a resin transfer molding method or by the rotomolding method.

19. The process in accordance with claim 17, further comprising subsequently postforming under pressure, vacuum, heat or a combination thereof.

20. The process in accordance with claim 18, further comprising subsequently postforming under pressure, vacuum, heat or a combination thereof.

21. Composite materials produced in accordance with the process of claim 13.

22. Composite materials produced in accordance with the process of claim 19.

23. Composite materials produced in accordance with the process of claim 20.

* * * * *